United States Patent
Bellusci et al.

(10) Patent No.: US 9,526,028 B2
(45) Date of Patent: Dec. 20, 2016

(54) REDUCED PROCESSOR LOAD FOR WIRELESS COMMUNICATION BETWEEN MASTER UNIT AND SENSOR UNIT

(71) Applicant: XSENS HOLDING B.V., Enschede (NL)

(72) Inventors: Giovanni Bellusci, Hengelo (NL); Raymond Zandbergen, Enschede (NL); Per Johan Slycke, Schalkhaar (NL)

(73) Assignee: XSENS HOLDING B.V., Enschede (NL)

( * ) Notice: Subject to any disclaimer, the term of this patent is extended or adjusted under 35 U.S.C. 154(b) by 210 days.

(21) Appl. No.: 14/303,127

(22) Filed: Jun. 12, 2014

(65) Prior Publication Data

US 2015/0365842 A1   Dec. 17, 2015

(51) Int. Cl.
  *G08B 5/22*   (2006.01)
  *H04W 28/02*  (2009.01)
  *H04Q 9/00*   (2006.01)
  *H04W 84/20*  (2009.01)

(52) U.S. Cl.
  CPC ........... *H04W 28/0289* (2013.01); *H04Q 9/00* (2013.01); *H04W 28/0252* (2013.01); *H04Q 2209/10* (2013.01); *H04Q 2209/40* (2013.01); *H04Q 2209/82* (2013.01); *H04Q 2209/823* (2013.01); *H04W 84/20* (2013.01)

(58) Field of Classification Search
  None
  See application file for complete search history.

(56) References Cited

U.S. PATENT DOCUMENTS

| 8,165,844 | B2  |   | 4/2012 | Luinge et al. |
|-----------|-----|---|--------|---------------|
| 8,947,206 | B2  | * | 2/2015 | Dijkstra ............. H04Q 9/00 340/505 |
| 2011/0109438 | A1 |   | 5/2011 | Dijkstra et al. |

* cited by examiner

*Primary Examiner* — Adolf Dsouza
(74) *Attorney, Agent, or Firm* — Miller, Matthias & Hull LLP

(57) ABSTRACT

A system and method of communicating efficiently and reliably between a sensor unit and a master unit, especially in a wireless system, is provided. The disclosed techniques require only minimal processing by the sensor unit for communications purposes and as such, the described system and method can be implemented in systems with tight constraints on the sensor unit side in terms of required memory, power consumption, and cost, such as in wearable sensor systems.

31 Claims, 6 Drawing Sheets

US 9,526,028 B2

REDUCED PROCESSOR LOAD FOR WIRELESS COMMUNICATION BETWEEN MASTER UNIT AND SENSOR UNIT

TECHNICAL FIELD

This disclosure relates generally to wireless sensor network systems and, more particularly, to communications between a master unit and a sensor unit in such systems.

BACKGROUND

A wireless sensor system is one wherein sensors communicate wirelessly with a master unit. The master unit may in turn communicate with a stationary desktop unit or the like. The wireless connection allows for enhanced mobility, however, it also causes some inevitable data loss if an unreliable wireless transmission link is utilized. This problem is especially critical for cases where the actual quantity of interest for the final application is obtained by further sensor data processing.

This is for example the case when the wireless sensing units contain, among others, inertial sensors (accelerometers and gyroscopes). In this case, the sensor readings are acceleration and angular velocity in sensor frame, whereas the final application generally employs the integral quantities of orientation, velocity, or position, expressed in a global reference frame. These integral quantities are typically calculated by solving differential equations of motion starting from acceleration and angular velocity signals, usually within a sensor fusion framework which further processes data from other sensors, e.g., magnetometers, pressure sensors, GPS, WiFi, etc.

In many applications, it is not practical to run the complex sensor fusion algorithms directly on the wireless sensor, since such algorithms pose demands in terms of memory, processing requirements and power consumption that may overtax small battery-powered wireless sensors, e.g., those embedded in wearable systems. In some applications, it is necessary to run sensor fusion algorithms at an application processor side, in order to facilitate combination of the inertial sensor readings with additional information from, e.g., map-matching, WiFi, GSM networks and the like, which can only be gathered from higher layer applications to which the wireless sensing lacks direct access.

In either case, it is necessary to stream inertial data from the wireless sensor to a master unit through a wireless link. If this is performed by simply transmitting the direct accelerometer and gyroscope readings, the inevitable occurrence of packet loss will result in inaccurate integral values. This in turn typically requires that the inertial quantities be re-initialized, introducing errors, instability, and inconsistency, and decreasing for overall performance.

In addressing the aforementioned limitation, US 2011/0109438 A1 discloses a reliable wireless communication between a master unit and a sensor unit. According to the method disclosed therein, a sensor unit senses acceleration and angular velocity samples and then further calculates velocity and orientation increments representing their corresponding integral quantities within a time interval. The communication between the master unit and the sensor unit is initiated by the master unit with a data update request message. The data update request message additionally includes an identification of an initial sample sequence number from which the integration of acceleration and angular velocity into velocity and orientation increments should be calculated at the sensor unit. Upon receipt of the data update request message, the sensor unit resets the integration interval starting time according to the sequence number provided by the master unit, and further transmits its last-calculated integrals of acceleration and angular velocity. The identification of initial sample sequence number transmitted from the master unit to the sensor unit indicates the last correctly received packet at the master unit side, and it therefore serves as means for acknowledgement for actual packet reception.

The mechanism described in US 2011/0109438 A1 therefore offers the desired robustness to occasional packet loss introduced by the wireless link. In fact, if no data packet loss occurs, the master unit will provide an acknowledgment to the sensor unit after every single received sample, and the sensor unit will reset at each of these samples the start time for the window in which integration of acceleration and angular velocity is performed. Similarly, if for example a single transmitted sample from the sensor unit is lost, the sensor unit will not receive the corresponding acknowledgment from the master unit and it will simply continue to integrate acceleration and angular velocity during the next sample as well. Such new sample will be transmitted in the next corresponding transmission slot, and it will contain the overall integral from the last acknowledgment received from the master unit (i.e. the integral will cover in this specific case a time window corresponding to the last two acceleration and angular velocity samples). In this way, even if packet loss occurred, no integral quantity is lost even during real-time operation; sensor fusion algorithms at an application processor side can therefore continue to run without any noticeable impairment in performance (there will only be a coarser time resolution in data representation).

While the foregoing system remains ideal for many situations and is better than most available solutions, there may exist situations wherein it is desired to eliminate the use of acknowledgements from the master unit to the sensor unit. The inventors have observed that eliminating acknowledgements will serve to reduce or eliminate the need for certain detailed record keeping at the sensor unit. Moreover, the reduction in parsing and processing data messages from the master unit reduces processing requirements and the time allocated within each frame to perform said processing, increasing the overall wireless transmission efficiency.

While for some cases the additional record keeping and processing loads do not pose significant limitations for practical use, in applications with tight constraints in terms of used memory, power consumption and cost, e.g., wearable devices and accessories, savings in these areas can be important to system performance and unplugged runtime.

This Background section is provided as a convenience to the reader before reading the detailed disclosure, and it is hoped that this section was helpful. However, the contents of this section are not a substitute for prior art, and do not represent a search for prior art. All discussion in this section, including that regarding the listed publication, represent the inventors own observations and are expressly disclaimed as prior art; they do not constitute prior art nor are they an admission as to prior art. To the extent that the contents of the noted publication are of interest and a full and accurate understanding of that reference is needed, then the reader must refer to the publication itself.

SUMMARY

This disclosure describes a system and method that enable reliable wireless communications between a sensor unit and a master unit, in particular requiring only minimal processing by the sensor unit for communications purposes. In this way, the described system and method can be implemented in systems with tight constraints on the sensor unit side in terms of required memory, power consumption, and cost, such as in wearable sensor systems.

In an embodiment, the disclosed system and method overcome the need for acknowledgements from the master unit to the sensor unit, simplifying the book-keeping and protocol state machine for the sensor unit, allowing it to reduce its processing requirements. In this way, the operation of the sensor unit can be simplified to data forwarder only, dramatically reducing overall system demands, while preserving the level of performance enabled by the system discussed in the background.

BRIEF DESCRIPTION OF THE DRAWINGS

For a more complete understanding of the disclosed methods and apparatuses, reference should be made to the embodiments illustrated in greater detail in the accompanying drawings, wherein.

Figure 1:
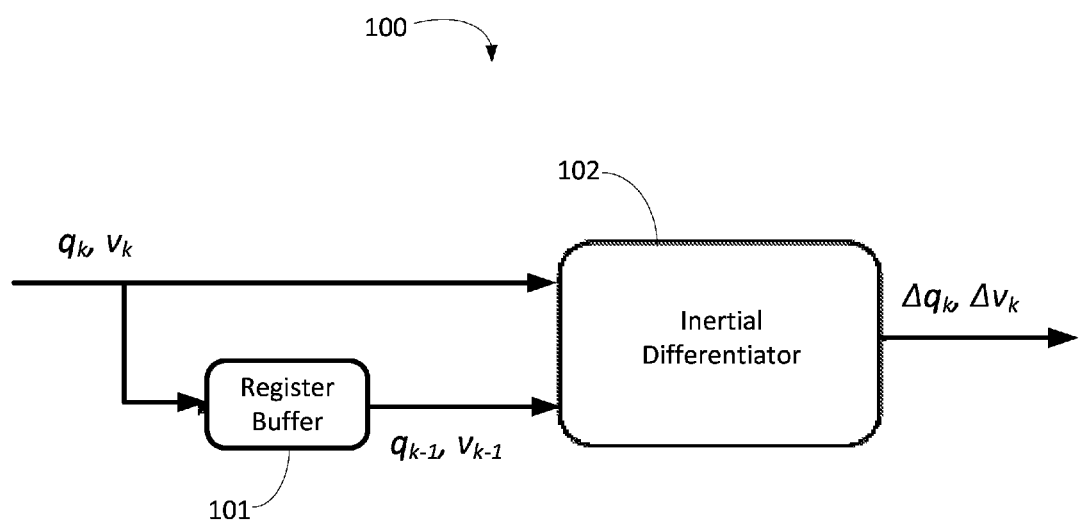
FIG. 1 is a schematic diagram of a inertial differentiation receiver in keeping with the disclosed principles.

It should be understood that details which are not necessary or useful for an understanding of the disclosed methods and apparatuses may be omitted. It should be understood, of course, that the principles of this disclosure are not limited to the specific embodiments illustrated herein.

DETAILED DESCRIPTION

Before discussing the disclosed system and method in detail, a brief overview will be given to aid the reader. As noted above, the inventors have noted that it is desirable to reduce processing and book-keeping requirements at the sensor side in a sensor unit/master unit pairing. In this pairing, the stream from the sensor unit to the master unit includes a continuous integral of acceleration and angular velocity, without any reset of the integration intervals upon reception of an acknowledgment from the master unit. This is accomplished by implementation of an inertial integration transmitter at the sensor unit, which operates in conjunction with an inertial differentiation receiver at the master unit. The construction, operation and benefits of such a system will become apparent as the system is discussed in conjunction with the illustrated figures.

The sensor unit first converts high rate angular velocity samples $\omega_s$ and acceleration samples $\alpha_s$, collected at a sample rate $f_S$, into orientation increments $\Delta q_k$ and velocity increments $\Delta v_k$ at lower a output rate $f_R$, using strap-down integration (SDI). In order to ensure robustness to coning and sculling errors, the sample rate $f_S$ is preferably well above 100 Hz. For example, $f_S$ may be between a few hundreds and several thousands of Hz, depending on application and performance requirements. The output rate $f_R$ is usually application dependent and may range from a fraction of a Hz to 100s of Hz or more.

The orientation increments $\Delta q_k$ and velocity increments $\Delta v_k$ are especially suited for further processing in sensor fusion applications. However, if the sensor directly transmits these increments to the master unit, any packets dropped during transmission will result in a loss of integral quantity, with consequent detrimental effects on performance.

To overcome this problem, the sensor unit instead implements in place an inertial integration transmitter. Specifically, the sensor unit calculates and transmits through the wireless link a continuously integrated orientation $q_k$ and velocity $v_k$. For ease of reference, $q_k$ and $v_k$ at output sample k can be calculated as:

$$q_k = q_{k-1} \odot \Delta q_k \tag{1}$$

$$v_k = v_{k-1} + q_{k-1} \odot \Delta v_k \odot q_{k-1}^c \tag{2}$$

where $\odot$ represents the quaternion multiplication operation, and the apex c denotes the conjugate operation. The respective initial conditions at sample time k=0, corresponding for example to the time in which the sensor is powered on, or to the time in which a data recording session is started can be seen as:

$$q_0 = [1\ 0\ 0\ 0]$$

$$v_0 = [0\ 0\ 0]$$

In order to improve efficiency in use of transmission resources, the sensor unit may transmit only three components of the orientation quaternion $q_k$; in this case, the missing forth component could be reconstructed by the master unit, using the known unity norm property of quaternion orientation representation.

Note that although $q_k$ and $v_k$ may at first sight appear as quantities that can be directly used by sensor fusion algorithms, resembling the usually desired measures of sensing unit orientation and velocity, this is not an accurate assumption for the following reasons:

The integrated velocity $v_k$ also includes gravity, that is, it is not a direct measure of the actual sensor velocity;

The frame in which the quantities are calculated is arbitrary;

$q_k$ and $v_k$ will exhibit unbounded drift resulting from the integral operation. For example, for the MEMS class of inertial sensors, there may be gyroscope bias on the order of a few degrees per second. As such, after a single minute of operation, the orientation may drift 180 degrees or more.

Therefore, the indicated quantities are not directly useful within a sensor fusion framework. However, as it will become apparent, continuously integrated orientation and velocity can be further processed by a dedicated receiver architecture implemented at the master unit side, in order to retrieve the desired original orientation and velocity increments $\Delta q_k$ and $\Delta v_k$, respectively. This will be disclosed in more detail hereinafter.

To consider an easy initial example, assume that with no packet loss, starting from a pair of orientation and velocity samples at consecutive sample times k−1 and k, the receiver at the master unit side can reconstruct the original $\Delta q_k$ and $\Delta v_k$ by inverting the equations given in (1), (2). This results in:

$$\Delta q_k = q_{k-1}^c \odot q_k \tag{3}$$

$$\Delta v_k = q_{k-1}^c \odot (v_k - v_{k-1}) \odot q_{k-1} \tag{4}$$

The orientation and velocity increments are suited for further processing by sensor fusion algorithms. By way of practical implementation, the equations in (3) and (4) can be implemented with the inertial differentiation receiver 100 shown in FIG. 1.

The register buffer 101 as illustrated stores the lastly received pair of orientation and velocity samples, which are processed together with the newly received pair of orientation and velocity samples by the inertial differentiator module 102 which implements the equations in (3), (4).

While the previous example assumes no packet loss, the same operation can be generalized using an arbitrary pair of samples in time. In this case the increments calculated at receiver side will be simply referred to a larger time window, but no loss of integral quantity will occur. In fact, consider for sake of example the case in which the packet at sample time k is lost but the packets at sample times k−1 and k+1 are correctly received. The master unit will know this, for example, by referring to the frame identification number embedded in each data packet. In this case, at time k the master unit will not be able to retrieve the corresponding increments, resulting in momentary loss of resolution only. However, at time k+1 the master unit will be able to calculate the following increments:

$$\Delta q_{k+1,k} = q_{k-1}{}^c \odot q_{k+1}$$

$$\Delta v_{k+1,k} = q_{k-1}{}^c \odot (v_{k+1} - v_{k-1}) \odot q_{k-1}$$

where $\Delta q_{k+1,k}$ and $\Delta v_{k+1,k}$ denote that the increments cover two time instants, namely k+1 and k. At time k+1 the information in terms of integral quantity is perfectly preserved, even though at time k a packet loss occurred. This method, here illustrated in detail for sake of example for the case of a single lost packet, generalizes to an arbitrary number of missed packets.

Looking closer at the integration operations in (1)-(2), being orientation quaternions unitary in norm, $q_k$ can always be represented with sufficient accuracy with only a limited number of bits. Additionally, while internal calculations may usually need to be performed with high accuracy (e.g. 32 bits or more), the output data to be streamed through the wireless link can be truncated to a much smaller number of bits. For example, for the MEMS class of sensors, a number of bits ranging from 8 to 24 for $q_k$ is typically sufficient, depending on specific application requirements. In this respect, an intrinsic advantage of the proposed solution lies in inherent robustness to output truncation errors, which on the contrary are generally detrimental for applications further involving integral operations.

Indeed, since the integrals are performed with high accuracy before truncation, an output truncation on a limited number of bits before streaming over the wireless causes only momentary poorer resolution, and not growing errors that may arise when truncating with the same limited number of bits $\Delta q_k$. This allows for efficient use of wireless transmission resources. Note that this consideration also holds for the case of $v_k$. This provides an additional intrinsic benefit of the proposed solution, compared to simply streaming orientation increments $\Delta q_k$ and velocity increments $\Delta v_k$ over the wireless link.

The case of $v_k$ will be discussed in slightly more detail. Although the sensor velocity is physically limited, the velocity calculated as in (2) will generally grow boundless over time, both because of inevitable accumulation of errors, and due to the fact that $v_k$ also includes the gravity vector.

For example, under ideal stationary conditions, in a worst case scenario $v_k$ can grow to as much as about 1000 m/s after just one and half minutes.

However, considering fixed point numerical representation for the quantities of interest, as common for typical applications in place, if no packet loss occurs, then preventing overflow is generally straightforward, given appropriate choice for the numerical representation of the integer part of $v_k$. In fact, what will actually constitute a $\Delta v$ overflow is not a specific wraparound in the numerical data representation (i.e. a value of $v_k$ which exceeds its maximum value and rolls-over starting again from the minimum value representation), but instead the occurrence of a difference between two consecutive velocity samples $v_k$ and $v_{k-1}$ which in modulo is larger than half of the useful data representation range in $v_k$.

Figure 2:
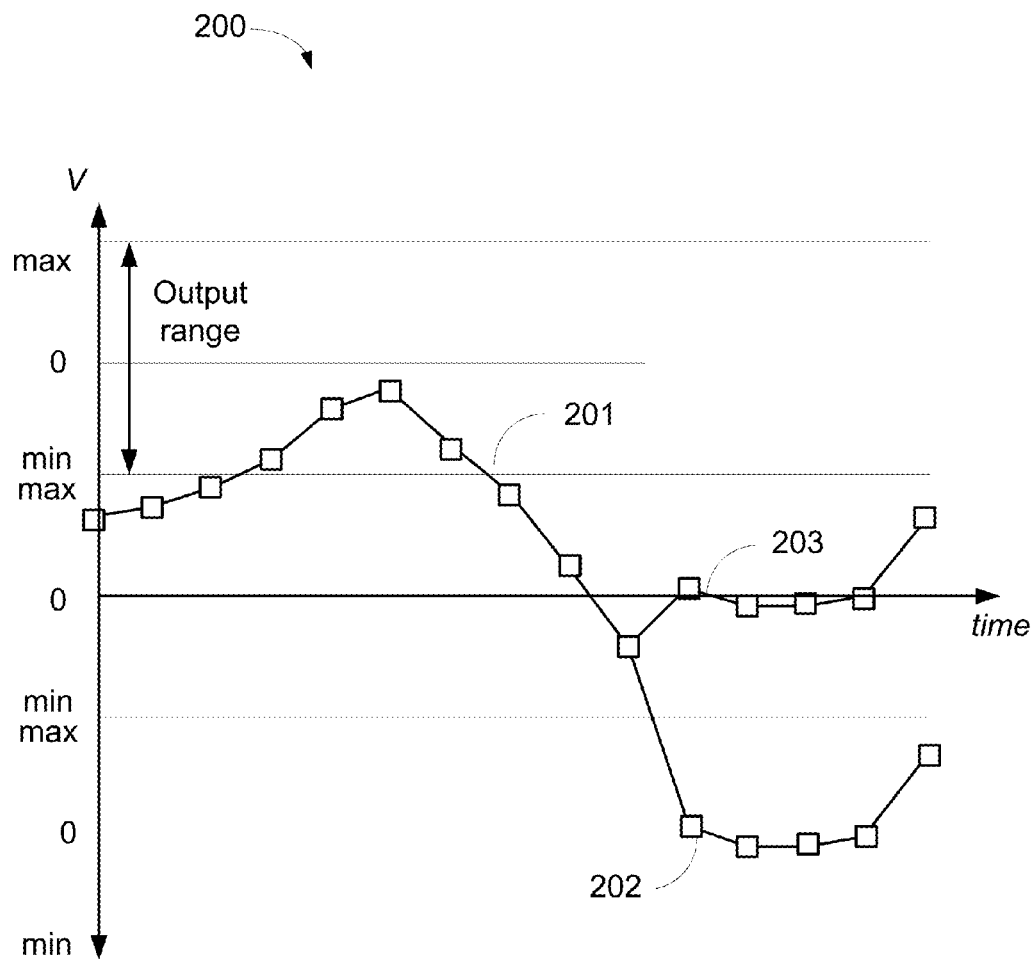
FIG. 2 is a schematic diagram showing the occurrence of Δv overflow.

FIG. 2 further explains this point by means of example. The primary line shows the integrated velocity 201. However, at point 202, there is an overflow, such that after that point, an incorrect reconstruction 203 is yielded rather than the actual properly integrated velocity 201.

For example, considering an accelerometer with a range of 16 g and an output rate $f_R$ of 10 Hz, the maximum (theoretical) velocity change which can be measured within an output interval would be about 16 m/s. Therefore, 5 bits for the representation of the integer part of $v_k$ would be sufficient.

The consideration previously proposed however, will not hold in case of packet loss. While in most frequently occurring cases packet loss is limited to just a single or a few samples, in some occasions it could actually last for minutes, for example if the sensor unit is out of the wireless range of the master unit for prolonged time. It becomes apparent that in this case, no specific assumption can be made on the time interval between reception of two velocity samples, and hence of the specific representation of $v_k$ which would allow a guarantee of no $\Delta v$ overflow. The longer the wireless is out of range (i.e., the longer that packets are being dropped), the more number of bits would be necessary for representation of the integer part of $v_k$.

However, in practical terms, in the event of a prolonged period of being out of range, it will typically no longer be useful to continue integrating the velocity $v_k$. In particular, even when starting to receive samples again, if the time difference between a pair of samples becomes too large, although the corresponding orientation and velocity increments could again be calculated, they would not be accurate anymore. As a consequence, at the sensor fusion side it is useful to perform a re-initialization of the filter, for example using a pair of velocity and orientation samples after detection of a prolonged outage. An outage may be determined to be prolonged if its duration exceeds a predetermined time period.

To provide practical considerations by way of example, consider a typical gyroscope bias of a couple of deg/s. If a particular outage has lasted for 30 seconds, the orientation increment corresponding to such time interval could be inaccurate by as much as 60 degrees and the velocity increment may be as inaccurate as about 150 m/s.

For this reason, while in principle the proposed approach can inherently suffer from $\Delta v$ overflow during prolonged outages, it may be desirable in such cases to perform a filter reset at the sensor fusion side. For this reason, in practice only a very few additional bits are necessary for representing the integer part of $v_k$. For example, depending on application, even just between 5 and 15 bits for the integer part of $v_k$ would ensure proper operation of the proposed solution in practice for a broad variety of applications and sensor classes.

In practical applications, a sensor may sometimes exceed its designed output range, causing sensor clipping. In fact, while in the large majority of cases the induced dynamics are well within the sensing element maximum range, for many occurring motions, the sensor output may occasionally and temporarily exceed it. This may happen for example for the case of body motion capture systems for accelerometers mounted on a foot, after a jump. In this case, at the time of impact the accelerations may be well in excess of several tens of g, whereas the accelerometer range for such use is typically only 8 or 16 g. Similarly, for gyroscopes embedded in hand-held devices, excitations may well exceed several thousands of degrees per second, although for only a very short time, whereas typical gyroscope range for these applications may be up to 2000 deg/s.

The occurrence of sensor clipping directly results in loss of integral quantity; this is potentially detrimental for applications involving further calculation of quantities such as orientation, velocity, or position. Sensor fusion frameworks can offer robustness to occurrence of sensor clipping, for example by increasing the statistical uncertainty of the related states and by temporarily relying more on complementary sources of information. For example, in case of orientation applications, upon occurrence of gyroscope clipping, the sensor fusion solution may rely more on magnetometer readings to estimate the device orientation. Similarly, in case of a full body motion tracking system such as that described in U.S. Pat. No. 8,165,844 B2, in case of clipping of an accelerometer sensor mounted on a foot after a jump, the position of the foot sensor may still be estimated by knowledge of the position of the lower leg and of the orientation of the lower leg and of the foot, together with a biomechanical model.

However, the detection of the occurrence of sensor clipping remains important. State of art sensing units detect occurrence of sensor clipping by means of dedicated sensor clipping flags. For example, if within a given sample time the sensor has clipped, a corresponding flag is raised. This allows the system to respond and to provide the desired robustness in performance upon occurrence of sensor clipping.

However, in systems in which a wireless communication between a sensor unit and a master unit is in place, this does not ensure the desired robustness in case of packet loss. In fact, if sensor clipping occurs in conjunction with a lost packet, the master unit may have no means to be notified of the clipping event. As a consequence, although the disclosed technique would allow the master unit to properly calculate orientation and velocity increments even in case of packet loss upon reception of new orientation and velocity samples, the increments would not be correct as result of sensor clipping occurring during a missed packet.

While an acknowledgment mechanism may address this issue, it would carry with it the drawbacks discussed above, e.g., forcing the sensor unit to implement detailed bookkeeping and to process messages from the master unit before parsing the proper output packet. In one embodiment of the disclosed principles, the sensing unit transmits at a generic sample time k a clipping counter $c_k$ instead of just a clipping flag. The clipping counter $c_k$ may be either a counter specific to each sensing element type (accelerometer and gyroscope), or a counter specific to each channel of each sensing element. Implementing the last option is usually preferred in case the highest level of performance is desired. Upon occurrence of sensor clipping at a given sample time k, the sensor unit simply increases the counter, i.e.

$c_k = c_{k-1}+1$ if (sample k has clipped).

In this way, the master unit simply detects the occurrence of clipping by comparing the last two received clip counters. If the counters differ, the master unit is notified of the occurrence of a clipping event. In this way, packet loss is generally immaterial for proper detection of a clipping event. Consider the general case of N lost packets (the specific case of no lost packets would simply result in N=0), before reception of the current packet at time k. The master unit can simply detect clipping as:

CLIPPING=NOT($c_k == c_{k-N-1}$)

where the symbol "==" denotes the logical comparison operator.

Although it is theoretically possible that the occurrence of clipping would not be detected in the case of prolonged packet loss since the counter $c_k$ could roll-over exactly to the same last value received from the master unit due to the practically limited number of bits $n_c$ used for numerical representation of $c_k$. However, for practical applications, this possibility can be minimized by using a limited number of bits $n_c$, e.g., as few as 6-10 bits is typically few enough for common applications.

In an alternative embodiment, a sub-implementation to address the aforementioned possibility is employed. Since in practical applications the occurrence of sensor clipping typically lasts for several consecutive samples, it may be more efficient to implement an end of sensor clipping event counter, together with a clipping bit which detects occurrence of sensor clipping at a given sample time.

In this embodiment, the sensor unit uses two different fields to communicate clipping to the master unit. The first is the clipping flag $f_k$. Said flag is simply a Boolean which is raised to one in case clipping event is detected for the corresponding sample. The second field is the end of clipping counter $e_k$. The sensor unit increases the counter every time a new clipping event is terminated, for example:

$e_k = e_{k-1}+1$ if ((sample k−1 has clipped) and (sample k has not clipped))

According to this second embodiment, the master unit can detect that a sensor clipping event has occurred according to the following logic:

CLIPPING=($f_k$==1) OR (NOT($e_k == e_{k-N-1}$) AND (N>0))

As with the prior embodiment, failure is possible, though much less so, if roll-over occurs at a specific moment. In this case, there may be a failure to detect clipping if there is a prolonged packet loss event and the number of end of clipping events exactly equals $2^{n_e}$, $n_e$ being the number of bits for representation of $e_k$. However, for practical applications this probability can minimized by using a limited number of bits $n_e$, e.g., as few as about 2-8.

In a typical wireless communication system application environment, wireless transmission resources will be limited. This becomes problematic in wireless sensor network systems composed of a relatively large number of closely grouped wireless nodes. This is the case for many body motion capture systems based on inertial sensing. In such systems, as many as 17 sensors or more are attached to most of the human body segments and are used to track the motion of the subject.

Although an evaluation of specific transmission rates achievable within a wireless sensor network system is elaborate and requires complex simulations accounting for specific implementation details in place, an illustrative example can be made considering an actual motion capture system targeting professional applications in which a maximum update rate of only 75 Hz can be achieved. This could pose an unacceptable limitation if the final application is interested in capturing all the fine details of a motion, as for example in movie character animation or in clinical analysis. In such applications, data sample rates as high as or greater than 200 Hz are often desirable.

In yet other systems, as for example wearable devices targeting consumer electronics, it may instead be desired to use lower wireless transmission rates, in order to reduce the sensor power consumption while preserving the required level of visual performance provided by sufficiently fine resolution in the data samples representation.

In yet further systems, high data sample rates may be desired in order to perform additional data processing, such as for detection of impacts or stillness to apply zero velocity updates (ZUPT) within sensor fusion processing. In those applications it may be necessary to perform such detection at a master unit running sensor fusion, since the detection algorithms may require specific sensor fusion outputs, as e.g. velocity or position quantities expressed in a global reference frame.

In these wireless sensor networks, the actual data payload represents only a small portion of the overall channel capacity available. For example, considering again the illustrative case of the motion tracking system for professional applications, the 75 Hz transmission rate for each of the 17 sensor units is practically achieved with a wireless link having overall 1 Mb/s bandwidth and a packet data payload of only about 30 bytes. This means than only one third of the overall channel capacity is actually used for sensor data transmission. The remaining portion of the theoretically available channel capacity is wasted due to wireless transmission overheads introduced by physical and MAC protocol layers (e.g. time-guard intervals for the TDMA protocol, CRC, frame and packet counter fields, status flags, time slots reserved for processing time, etc.).

In order to address such limitations, in a basic implementation the sensor unit may transmit to the master unit within a single data transmission, a set of m orientation and velocity samples, denoted for notational convenience as:

$$q_{k,0}, q_{k,1}, \ldots, q_{k,m-1}; v_{k,0}, v_{k,1}, \ldots, v_{k,m-1}$$

These increment samples are calculated at a relatively high rate, with period T, and transmitted to the master unit at a lower rate, with a transmission period equal to mT. For typical applications, m may be between 2 and 20, although different range of values are possible for specific applications. The potential advantage of this basic implementation is the reduction of the required transmission overhead. A potential drawback is the use of a rather inefficient data format representation. For example, as discussed in the previous sections, several bits are necessary to represent the integer part of the velocity v in order to guarantee robustness to overflows. This would cause wasting of several bytes of data payload in practical applications in place.

To address the aforementioned limitations, in a less basic embodiment, the sensing unit transmits within a frame k not only a pair of orientation and velocity samples, $q_k$ and $v_k$, respectively, but also an additional set of m−1 pairs of orientation and velocity increments. As a Nonlimiting example, in one embodiment the orientation and velocity samples, $q_k$ and $v_k$ are referenced to the end of a given transmission period mT, whereas the increments may be referenced to the last m−1 increment intervals with duration T, within said transmission period. Said increments represent the direct SDI outputs calculated at relatively high rate, with period T, and are in the following denoted as:

$$\Delta q_{k,0}, \Delta q_{k,1}, \ldots, \Delta q_{k,m-2}; \Delta v_{k,0}, \Delta v_{k,1}, \ldots, \Delta v_{k,m-2} \quad (5)$$

Figure 3:
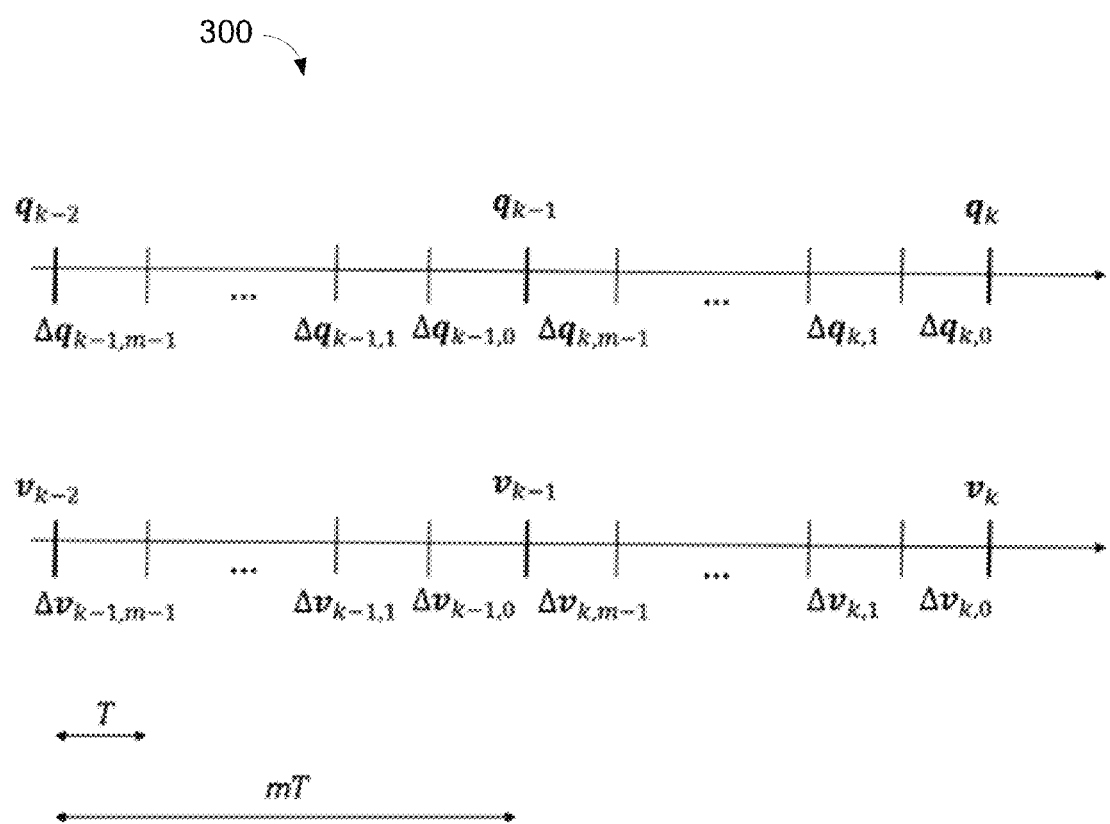
FIG. 3 illustrates a timing diagram of a hybrid inertial data frame in keeping with the disclosed principles.

FIG. 3 shows a timing diagram 300 associated with this implementation for the sake of example. Those of skill in the art will of course appreciate that alternative frame specifications are entirely possible. In particular, the illustrated example shows sample frames for both orientation and velocity samples, $q_k$ and $v_k$.

Figure 4:
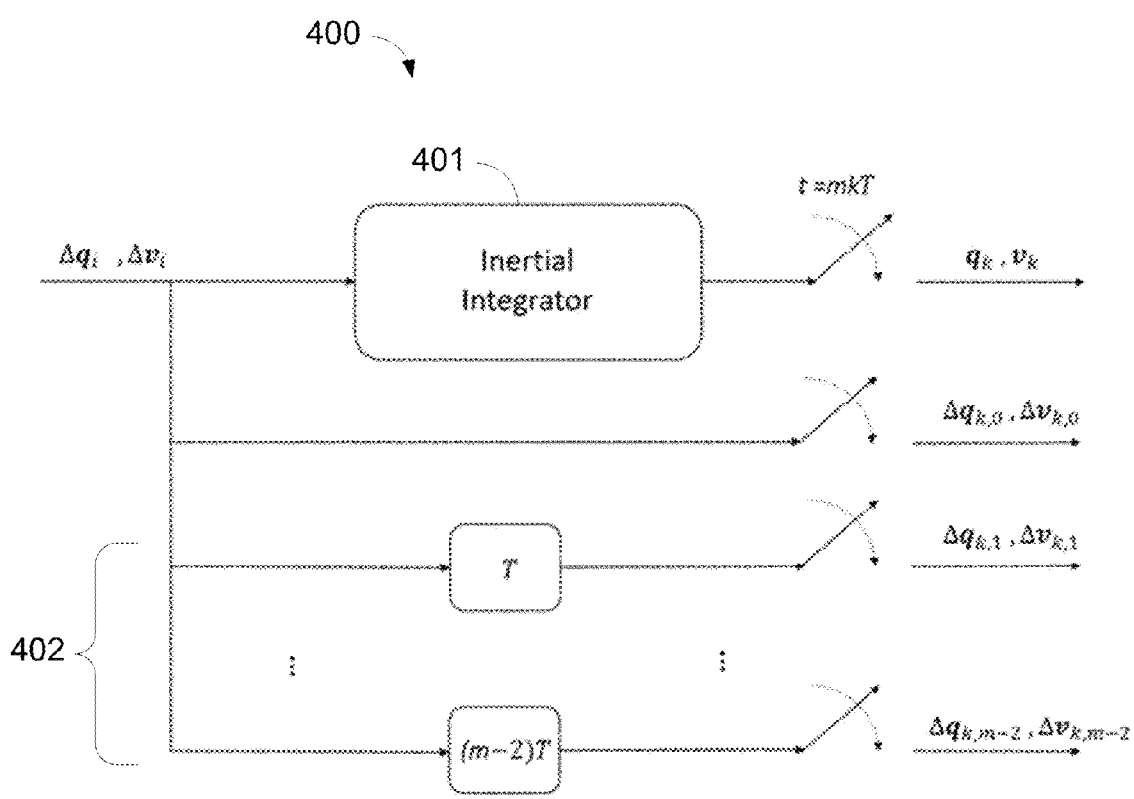
FIG. 4 is a schematic diagram of a hybrid inertial transmitter in keeping with the disclosed principles.

In order to implement such functionality, in an embodiment the sensor module has in place a hybrid inertial transmitter 400 such as the one shown in FIG. 4. In the figure, the SDI output increments are processed by a first branch, the inertial integrator 401, which calculates as outputs the orientation and velocity samples according to:

$$q_i = q_{i-1} \odot \Delta q_i$$

$$v_i = v_{i-1} + q_{i-1} \odot \Delta v_i \odot q_{i-1}^c$$

The hybrid inertial integration transmitter 400 is additionally composed by a rack 402 of m−2 registers, each storing a pair of rotation and velocity increments with an increasing delay:

$$T, \ldots, (m-2)T$$

with respect to the input pair of orientation and velocity increments. An additional branch connects an output directly to the input.

The output of the proposed hybrid transmitter is represented by a snapshot of the overall branches sampled at generic sample time t=kmT.

Figure 5:
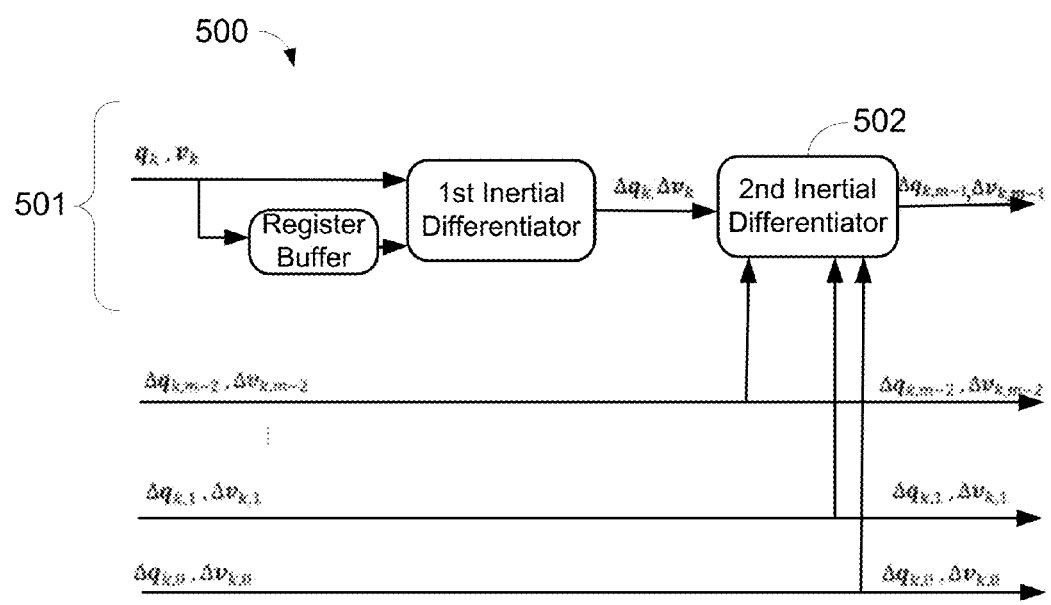
FIG. 5 is a schematic diagram of a cascaded inertial differentiation receiver in keeping with the disclosed principles.

In an embodiment, the hybrid inertial integration transmitter previously described works in conjunction with a cascaded inertial differentiation receiver 500, shown in an example implementation in FIG. 5.

The orientation $q_k$ and velocity $v_k$ at generic packet time k are processed by a first branch 501 of the receiver 500, which calculates from the lastly received pair of orientation and velocity samples, the corresponding rotation and velocity increments. Considering for sake of example the situation of no packet loss, this results in:

$$\Delta q_k = q_{k-}^c \odot q_k$$

$$\Delta v_k = q_{k-1}^c \odot (v_k - v_{k-1}) \odot q_{k-1}$$

The increments are calculated within a time interval mT $\Delta q_k$ and $\Delta v_k$ are further processed by a second inertial differentiator 502, which additionally receives as input the m−1 pairs of orientation and velocity increments transmitted within the same data packet at time k:

$$\Delta q_{k,0}, \Delta q_{k,1}, \ldots, \Delta q_{k,m-2}; \Delta v_{k,0}, \Delta v_{k,1}, \ldots, \Delta v_{k,m-2}$$

The output of the second inertial differentiator 502 is represented by:

$$\Delta q_{k,m-1} = \Delta q_k \odot (\Delta q_{k,m-2} \odot \ldots \odot \Delta q_{k,1} \odot \Delta q_{k,0})^c =$$

$$\Delta q_k \odot \Delta q_{k,0}^c \odot \Delta q_{k,1}^c \odot \ldots \odot \Delta q_{k,m-2}^c \Delta v_{k,m-1} = \Delta v_k - \sum_{j=m-2}^{0} R\Delta v_{k,j}$$

With:

$$R\Delta v_{k,j} = (\Delta q_{k,m-1} \odot \ldots \odot \Delta q_{k,j+1}) \odot \Delta v_{k,j} \odot (\Delta q_{k,n-1} \odot \ldots \odot \Delta q_{k,j+1})^c$$

In this way, if no packet loss occurs, at a given transmission frame k the disclosed solution is capable of retrieving the full set of m rotation and velocity increments at the original high rate sample period T:

$$\Delta q_{k,0}, \Delta q_{k,1}, \ldots, \Delta q_{k,m-1}; \Delta v_{k,0}, \Delta v_{k,1}, \ldots, \Delta v_{k,m-1}$$

While this example has assumed no packet loss, it will be appreciated by those of skill in the art that this technique preserves the desired robustness against the occasional occurrence of missed packets. In fact, occurrence of packet loss will only result in momentary lack of resolution within multiples of the wireless transmission period mT. However, no loss in integral quantity will result. Since the integrated orientation and velocity are always transmitted within a packet, the master unit is still able to calculate proper integral values, even upon occurrence of lost packets (the reconstructed increments $\Delta q_{k,m-1}$ and $\Delta v_{k,m-1}$ will simply be referred to larger time intervals in this case).

A significant benefit enabled by the foregoing embodiment is that higher transmission efficiency can be achieved in this way. In fact, considering the exemplary case of the transmitted velocity increments:

$$\Delta v_{k,0}, \Delta v_{k,1}, \ldots, \Delta v_{k,m-2}$$

A much smaller number of bits are needed in order to properly represent said increments, compared to a velocity sample v. For example, consider the practical case in which an accelerometer sensor has a maximum range of +−16 g and an SDI interval T=0.01 Hz; only two bits are necessary to represent the maximum possible value for a transmitted velocity increment $\Delta v_k$, whereas a velocity sample would require perhaps 15 bits for numerical representation of the integer part in order to guarantee robustness to overflows.

A similar consideration can be provided for the rotation increments, although the improvements are generally smaller than those for velocity.

Figure 6:
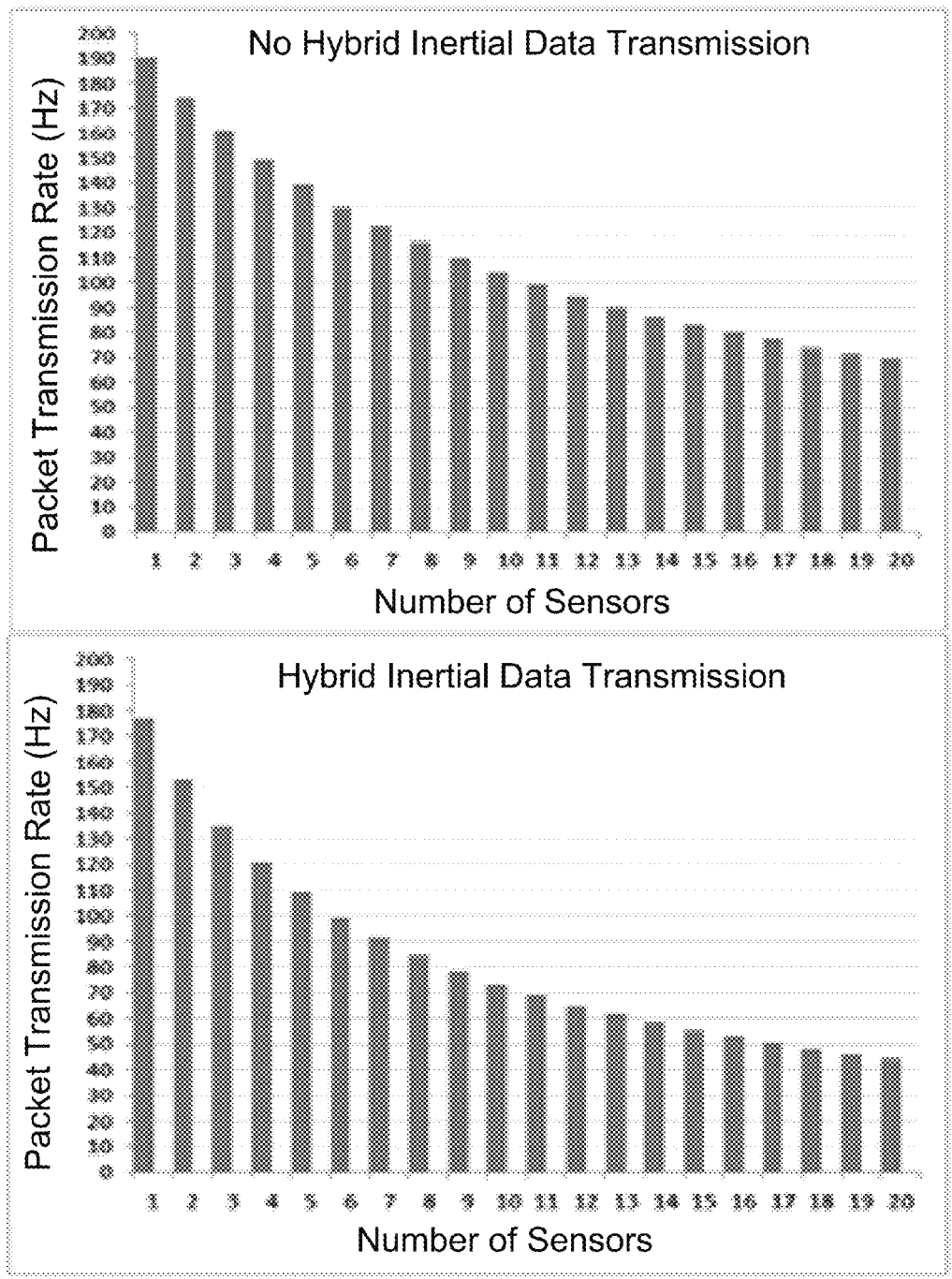
FIG. 6 is a results chart showing comparative data of a simulative comparison for a real system in place, in which the maximum packet transmission rate is compared to the maximum number of wireless sensor nodes allowed by an overall available transmission bandwidth of 1 Mbit/s.

For the sake of further example, FIG. 6 shows the results of a simulative comparison, in which the maximum packet transmission rate is calculated vs. the maximum number of wireless sensor nodes allowed by the overall available transmission bandwidth of 1 Mbit/s. On the left hand side of the figure, it is shown the case in which the data packet rate is the same as the orientation and velocity sample rate. On the right hand side, is shown the case in which the hybrid inertial data transmission disclosed in this section, is shown for the exemplary case of m=4.

For the specific considered example, this introduces about 50 bytes more of data payload. As a result, it can be seen that the maximum achievable packet transmission rate is decreased. For example, for the case of 17 wireless sensors, as actually in place for some body motion capture applications, the packet transmission rate is decreased from about 75 Hz down to about 50 Hz. However, this results in an actual data rate for the orientation and velocity increments of about 250 Hz.

While the techniques and systems disclosed above provide specific benefits for applications in which robust performance in real time applications is required, these innovations are also useful in applications in which retransmissions upon occurrence of packet loss may be desired. This may be the case in systems that need to ensure the highest level of performance in cases of off-line or delayed processing. In such applications, retransmission time-slots are usually allocated within time frames, in order to allow lost samples data to be retransmitted.

In one embodiment, this is achieved by means of acknowledgement mechanisms in place between the master unit and the sensor units. In one embodiment in which the inertial integration receiver is implemented at the sensor side, the sensor unit may store in a buffer a set of orientation samples: $q_{k-m+1}, \ldots q_k$ and a set of velocity samples $v_{k-m+1}, \ldots v_k$, corresponding to the last set of M samples after reception of an acknowledgment from the master unit to the sensor unit. Said acknowledgment may be transmitted from the master unit upon correct reception of all packets up to sample k. In this way, the sensor unit knows that all samples with sequence number lower or equal to k have been correctly received from the master unit and can therefore be removed from the buffer. On the contrary, samples with index larger than k will be retransmitted using dedicated retransmission timeslots. For efficient implementation, the sensor unit may retransmit the samples with order of priority decreasing for increasing k, such that samples with smaller index are retransmitted first.

In an alternative embodiment having the hybrid inertial transmission scheme implemented, the sensor unit may store in a buffer a set of orientation samples: $q_{k-m+1}, \ldots q_k$ and a set of velocity samples $v_{k-m+1}, \ldots v_k$, further associated with sets of corresponding orientation and velocity increments within each transmission frame, said increments for the generic transmission frame k being represented by:

$$\Delta q_{k,0}, \Delta q_{k,1}, \ldots, \Delta q_{k,m-2}; \Delta v_{k,0}, \Delta v_{k,1}, \ldots, \Delta v_{k,m-2}$$

The orientation and velocity samples and their corresponding sets of orientation and velocity increments within each transmission frame are similarly removed from the buffer upon reception by the sensor unit of an acknowledgment from the master unit, in the manner previously discussed. For example, upon reception of an acknowledgment of packet k, the sensor unit will remove from the buffer all of the orientation and velocity samples with index lower than k, together with their respective sets of orientation and velocity increments. This hybrid transmission scheme reduces buffer requirements.

In an alternative implementation, the sensor unit may instead use a circular buffer. In one embodiment of this implementation in which the inertial integration transmitter is in place, each newly processed pair of orientation and velocity samples $q_k$ and $v_k$, respectively, is stored in the buffer. Upon occurrence of a buffer full condition, the oldest pair of orientation and velocity samples is simply removed from the buffer to allow storage of the newly processed pair of orientation and velocity samples. For example, assuming the buffer has space for storing M pair of orientation and velocity samples, upon reception of a pair of samples $q_k$ and $v_k$, the pair of samples $q_{k-M}$ and $v_{k-M}$ is removed from the buffer. According to this implementation, the master unit rather than transmitting acknowledgments for packet reception transmits instead to the sensor unit a specific request for data message. Said message contains one or more sequence number values corresponding to the samples which need to be retransmitted by the sensor unit. For example, the master unit may request a pair of samples at frame k−j. Assuming j<M, the sensor unit will find the corresponding pair of orientation and velocity samples in the buffer and will transmit said samples in a dedicated retransmission time slot.

In an alternative embodiment having instead the hybrid inertial transmission scheme implemented, the sensor unit may store in a similar circular buffer a set of orientation samples: $q_{k-m+1}, \ldots q_k$ and a set of velocity samples $v_{k-m+1}, \ldots v_k$, further associated with sets of corresponding orientation and velocity increments within each transmission frame, said increments for the generic transmission frame k being represented by:

$$\Delta q_{k,0}, \Delta q_{k,1}, \ldots, \Delta q_{m-2}; \Delta v_{k,0}, \Delta v_{k,1}, \ldots, \Delta v_{k,m-2}$$

where, also in this case, M represents the number of orientation and velocity samples and their corresponding increments which can be stored in the buffer. Upon occurrence of a buffer full condition, the oldest pair of orientation and velocity samples together with their corresponding increments are again discarded from the buffer, to allow for storing of a new pair of orientation and velocity samples and their corresponding increments. In a similar way, upon occurrence of packet loss, the master unit may transmit a request containing one or more sequence number values corresponding to the orientation and velocity samples and their corresponding increments, which need to be retransmitted by the sensor unit.

It will be appreciated that new and inventive systems and techniques have been disclosed for improving communications between a sensor unit and a master unit. However, it should be noted that this description is not exhaustive, in that only certain embodiments have been set forth; alternatives and modifications will be apparent to those skilled in the art upon reading the above description. These and other alternatives are considered equivalents and within the spirit and scope of this disclosure and the appended claims.

The invention claimed is:

1. A method of communicating between a master unit and at least one sensor unit to be executed within a frame, wherein the at least one sensor unit has one or more sensing channels and is configured to have a data sampling frequency for sampling in time one or more of its sensing channels and is adapted to calculate and transmit time integrated samples, and the master unit is configured to receive and process said integrated samples, the method comprising the steps of:
   integrating by the at least one sensor unit sample values up to a current sequence number;
   transmitting during a portion of a frame by the at least one sensor unit integrated sample values and an identification of the current sequence number;
   receiving by the master unit the integrated sample values and the identification of the current sequence number;
   storing by the master unit one or more received integrated sample values and the identification of current sequence number in a register; and
   upon receiving at least second time integrated sample values and the identification of samples sequence number, calculating by the master unit sample values differences between current received integrated sample values and integrated sample values stored in the register.

2. The method according to claim 1, further comprising:
   associating by the master unit a samples time interval to said sample values differences; and
   replacing by the master unit the one or more integrated sample values and the identification of samples sequence number stored in the register by one or more received integrated sample values and samples sequence number.

3. The method according to claim 1, wherein the at least one sensor unit contains at least a 3D accelerometer and a 3D gyroscope.

4. The method according to claim 3, wherein the at least one sensor unit transmits to the master unit integrated sample values represented by 3D velocity and 3D orientation.

5. The method according to claim 4, wherein the integrated sample values stored by the master unit in the register are represented by a pair of 3D orientation and 3D velocity samples.

6. The method according to claim 5, wherein the master unit upon reception of at least a second pair of 3D orientation and 3D velocity samples calculates a pair of 3D orientation and 3D velocity increments from the current pair of 3D orientation and 3D velocity samples and the pair of 3D orientation and 3D velocity samples stored in the register.

7. The method according to claim 1 wherein the time interval associated by the master unit to sample values differences is calculated as the difference between the current samples sequence number and the samples sequence number stored in the register.

8. The method according to claim 1 wherein the integrated samples are truncated to a smaller number of fractional bits compared to the number of bits used for internal calculation of said integrated samples by the at least one sensor unit, before being transmitted to the master unit.

9. The method according to claim 6, wherein the integer part of each of the components of the 3D integrated velocity is numerically represented by a limited number of bits, before being transmitted from the at least one sensor unit to the master unit.

10. The method according to claim 9, wherein the master unit is configured to resolve occurrence of wrap-around in the numerical representation of any of the components of the 3D velocity samples by looking at the difference between each component of the received integrated 3D velocity value and the corresponding component of the integrated 3D velocity value stored in the register, said difference being smaller in absolute value than half of the integer representation range for said component of the integrated 3D velocity sample.

11. The method according to claim 1, wherein the at least one sensor unit is configured to detect occurrence of any of the sampled channels exceeding its maximum output range.

12. The method according to claim 11, wherein upon detection of a sampled channel exceeding its maximum output range, the at least one sensor unit increases a corresponding counter, which is also transmitted to the master unit.

13. The method according to claim 11, wherein upon detection of a sampled channel exceeding its maximum output range, the at least one sensor unit sets a corresponding flag which is also transmitted to the master unit.

14. The method according to claim 11, wherein upon detection of an event which denotes the end of a sampled channel exceeding its maximum output range, the at least one sensor unit increases a corresponding counter which is also transmitted to the master unit.

15. The method according to claim 2, wherein the at least one sensor unit transmits to the master unit integrated sample values represented by a set of 3D velocity and 3D orientation samples.

16. The method according to claim 2, wherein the at least one sensor unit transmits to the master unit integrated sample values represented by a 3D velocity and a 3D orientation and by a further set of 3D orientation increments and 3D velocity increments calculated within a frame.

17. The method according to claim 16, wherein the master unit upon reception of at least a second set in time of integrated sample values represented by a 3D velocity and a 3D orientation and by a further set of 3D orientation increments and 3D velocity increments calculated within a frame, calculates a 3D orientation increment and a 3D velocity increment samples according to the steps of:
calculating a first pair of a 3D orientation increment and a 3D velocity increment samples from the 3D orientation and 3D velocity samples received at current frame and the pair of 3D orientation and 3D velocity samples stored in the register; and
further calculating from said first pair of a 3D orientation increment and a 3D velocity increment samples, and from the set of received 3D orientation increments and 3D velocity increments samples, a new pair of a 3D orientation increment and a 3D velocity increment samples.

18. The method according to claim 2, wherein one or more retransmission slots are assigned per wireless transmission frame.

19. The method according to claim 18, wherein one or more 3D orientation and 3D velocity samples are stored in a buffer by the at least one sensor unit together with corresponding samples sequence numbers.

20. The method according to claim 18, wherein one or more 3D orientation and 3D velocity samples and a corresponding set of 3D orientation and 3D velocity increments samples are stored in a buffer by the at least one sensor unit together with corresponding samples sequence numbers.

21. The method according to either of claims 19 and 20, wherein the master unit transmit to the at least one sensor unit an acknowledgment message, said acknowledgment comprising a samples sequence number indicating the time up to which samples transmitted by the at least one sensor unit have been correctly received by the master unit.

22. The method according to claim 21, wherein upon reception of said acknowledgment from the master unit, the at least one sensor unit;
removes from the buffer samples having associated a corresponding samples sequence number smaller than or equal to the samples sequence number contained in the acknowledgment message transmitted by the master unit; and
retransmits one or more of the oldest samples and corresponding samples sequence number further stored in the buffer, in one or more retransmission time slots.

23. The method according to either of claims 19 and 20, wherein the sensor unit upon occurrence of buffer full, removes samples with associated the oldest samples sequence numbers to allow storing of newly processed samples and samples sequence numbers.

24. The method according to either of claims 19 and 20, wherein the master unit transmits to the at least one sensor unit a request for samples message, said message comprising samples sequence numbers indicating the samples to be retransmitted by the at least one sensor unit.

25. The method according to claim 22, wherein upon reception of a request for samples message, the at least one sensor unit retransmits in one or more retransmission time slots any of the samples and associated samples sequence number stored in the buffer, said retransmitted samples having the same samples sequence numbers contained in the request for samples message transmitted by the master unit.

26. The method according to claim 4, wherein the 3D orientation is represented with quaternion notation.

27. The method according to claim 26, wherein only three components of the quaternion are transmitted by the at least one sensor unit to the master unit.

28. The method according to claim 1, wherein the at least one sensor unit and the master unit communicate wirelessly.

29. A system comprising a master unit and at least one sensor unit, wherein the master unit and the at least one sensor unit are arranged to communicate using a wireless medium, said at least one sensor unit having one or more channels and being further arranged for sampling in time one or more of its channels with a data sampling frequency and for transmitting time integrated sample values to the master unit during a portion of a frame, and the master unit being further arranged for processing said integrated samples, wherein:
the at least one sensor unit is configured to integrate sample values up to a current sequence number and to transmit during a further portion of a frame the integrated sample values and the identification of current samples sequence number;
the master unit is configured to receive the integrated sample values and the identification of the current samples sequence number and to store one or more received integrated samples and the identification of samples sequence number in a register; and
the master unit is further configured to calculate sample values differences between received integrated sample values and integrated sample values stored in the register upon receiving at least a second time integrated sample values and the identification of samples sequence number, and to further replace the one or more integrated sample values and the identification of samples sequence number stored in the register by one or more received integrated sample values and samples sequence number.

30. The system according to claim 29, wherein the at least one sensor unit is further adapted to store integrated sample values and corresponding samples sequence numbers in a buffer.

31. The system according to claim 30, wherein the buffer is one of a circular buffer and a FIFO buffer.

* * * * *